United States Patent [19]
Kobayashi et al.

[11] 3,905,845
[45] Sept. 16, 1975

[54] TRANSLUCENT ALUMINA CONTAINING MAGNESIA YTTRIA AND LANTHIUM OXIDE

[75] Inventors: Kazuo Kobayashi, Nagoya; Masayuki Kaneno, Tokoname, both of Japan

[73] Assignee: NGK Insulators, Japan

[22] Filed: Oct. 25, 1973

[21] Appl. No.: 409,362

Related U.S. Application Data

[62] Division of Ser. No. 64,694, Aug. 18, 1970, Pat. No. 3,791,142.

[30] Foreign Application Priority Data

Aug. 27, 1969   Japan.............................. 44-67338

[52] U.S. Cl. .................... 106/62; 106/65; 106/73.4
[51] Int. Cl............................................. C04b 35/10
[58] Field of Search...................... 106/62, 65, 73.4

[56] References Cited
UNITED STATES PATENTS 3,377,176   4/1968   Wolkodoff et al................... 106/65
3,711,585   1/1973   Muta et al. .......................... 106/65

*Primary Examiner*—J. Poer
*Attorney, Agent, or Firm*—Robert E. Burns; Emmanuel J. Lobato; Bruce L. Adams

[57] ABSTRACT

A method of manufacturing a polycrystalline translucent alumina consisting of a high purity alumina and having excellent optical transmission property for the light in the visible spectrum, thermal shock resistance and mechanical strength which comprises the following steps, calcining alumina powders having a purity of more than 99.0% by weight as a starting material at a temperature of 1,050°–1,250°C in air, adding to said alumina powders 0.05–0.5% by weight of $Y_2O_3$, 0.05–0.5% by weight of $La_2O_3$ and 0.01–0.1% by weight of MgO, mixing and then molding said alumina powders added with said additives, sintering at first said molded mixture at a temperature of 1,200°–1,450°C and secondly sintering in vacuum or a reducing atmosphere at a temperature of 1,600°–1,800°C.

1 Claim, 6 Drawing Figures

TRANSLUCENT ALUMINA CONTAINING MAGNESIA YTTRIA AND LANTHIUM OXIDE

RELATED APPLICATION

This application is a division of our co-pending application Ser. No. 64,694 filed Aug. 18, 1970 now issued as U.S. Pat. No. 3,791,142.

This invention relates to methods of manufacturing a translucent sintered body containing aluminium oxide (hereinafter abbreviated to alumina) as its main ingredient and having excellent optical transmission properties for light in the visible spectrum, mechanical strength and thermal shock resistance.

Translucent alumina of a sintered body according to the prior art (described in the U.S. Pat. Nos. 3,026,177 and 3,026,210) contains alumina as its main ingredient with the addition of magnesia only and is finally sintered at a high temperature of more than 1,700°C, preferably 1,800°–1,950°C. The high temperature sintering step involves a high manufacturing cost and hence the translucent alumina is excessively high in price, thus limiting the purposes for which the translucent alumina is to be used. Moreover, owing to the high temperature sintering step, alumina crystal grains grow large in size and prevent pores closed in the alumina grains from escaping, with the result that not only the optical transmission property but also the thermal shock resistance, mechanical strength and gas tightness of the translucent alumina are considerably decreased and that particularly such reduced mechanical strength causes an inevitable breakage of an enveloping tube for a high pressure gas discharge lamp made of the translucent alumina owing to the sudden heat to which it is subjected.

The invention is based on the recognition that the many properties such as the optical transmission property, thermal shock resistance and the mechanical strength of translucent alumina can be considerably improved and the above disadvantages are removed by using special additives and special sintering conditions and particularly provides a method of manufacturing a translucent alumina having the advantages above mentioned, wherein the sintering step is carried out at a temperature lower than that of the prior art by 100°–200°C.

A feature of the invention is to provide a method of manufacturing a polycrystalline translucent alumina body consisting of a high purity alumina and having excellent thermal shock resistance and mechanical strength which comprises the following steps, calcining alumina powders having a purity of more than 99.0% by weight at a temperature of 1,050°–1,250°C in air, adding to said alumina powders 0.05–0.5% by weight of $Y_2O_3$, 0.05–0.5% by weight of $La_2O_3$ and 0.01–0.1% by weight of MgO, mixing and then molding and compacting said mixed powders, first sintering said compacted mixture at a temperature of 1,200°–1,450°C and secondly sintering it in vacuum or a reducing atmosphere at a temperature of 1,600°–1,800°C.

The method of manufacturing a translucent alumina body according to the present invention will now be described with reference to the sequence of steps. Gamma alumina powders having a particle size of 0.01–0.1 micron and a purity of more then 99.0% by weight are calcined in air at a temperature of 1,050°–1,250°C for 1–10 hours in an electric furnace to convert at least 90% by weight of the gamma alumina into alpha alumina. To this alpha alumina thus calcined are added 0.05–0.5% by weight of $Y_2O_3$ as a first essential additive, 0.05–0.5% by weight of $La_2O_3$ as a second essential additive and 0.01–0.1% by weight of MgO as a third essential additive, % being taken on the basis of the alumina powders. These powders are thoroughly mixed together in a trommel, for example, with water in such an amount that the water content in the mixture becomes about 60%. Then, the mixture is then dehydrated, for example, by a vacuum filter, and sufficiently dried at about 100°C. The dried mixture is then crushed and the crushed material is screened by passing it through a screen of 42–120 meshes to size it. To the material thus sized is added 1–2% by weight of polyvinyl alcohol as a binder and then is formed into a body by a cold press. The formed body thus obtained is subjected to a first sintering at a temperature of 1,200°–1,450°C and then to a second sintering in vacuum or a reducing atmosphere at a temperature of 1,600°–1,800°C. For this second sintering step, it is necessary to use a non-oxidizing atmosphere. Hydrogen gas or ammonium decomposed gas for use in the second sintering is subjected beforehand to a drying step in which said gas is brought into contact with, for example, an activated alumina.

In accordance with the present invention, the purity of the alumina powder used as a starting material must be more than 99.0% by weight. The use of the alumina powder having a purity of less than 99.0% by weight may have the possibility of evaporation of impurities during the high temperature sintering step and this evaporation causes not only pores enclosed in the alumina grains, but also a reaction with alumina to form a second phase thereby giving adverse effects upon the translucency and mechanical strength.

Furthermore, alumina powder is desirably in the form of thermally decomposed alumina from aluminium salts such as aluminium sulphate from the point of powder sinterability.

The reason why the alumina powders as a starting material are calcined at a temperature of 1,050°–1,250°C before sintering is as follows.

If the gamma alumina powders are calcined at a temperature less than 1,050°C in air, the gamma alumina powders do not change the activity and crystallinity, so that during sintering of a mold body the shrinkage of the sintered body is very large and the accuracy of the products is remarkably unstable. As the rapid sintering reaction occurs, the difference between the reaction rate of the active alumina particles and that of inactive particles makes a difference in the rate of grain growth, thereby causing irregularity in the grain size of the sintered body. This causes not only a reduction of the optical transmission property but also a grain boundary crack, thus decreasing the thermal shock resistance and mechanical strength. Moreover, it is not preferable to calcine the gamma alumina at a temperature higher than 1,250°C, for the particles of the alpha alumina thus obtained are excessively grown and stable, which prevent the sintering reaction. Moreover, the formability and workability become remarkably deteriorated. Thus, it is preferable to calcine the gamma alumina powders at a temperature of 1,050°–1,250°C for 1–10 hours in order to transform them into the alpha alumina powders. Unless the calcining condition is within these ranges, the above mentioned disadvantages occur.

The reason why the additives are added to the gamma alumina powders after calcining is as follows. If additives are added to the gamma alumina powders before the calcining, the transformation of the gamma alumina to the alpha alumina occurs locally owing to the local existence of the additives, whereby the grain growth of the alpha alumina becomes larger in part. If use is made of alpha alumina as a starting material and the alpha alumina satisfies the conditions required by the present invention, it is a matter of course that the above mentioned step of calcining the gamma alumina may be omitted.

The reason why 0.05–0.5% by weight of $Y_2O_3$, 0.05–0.5% by weight of $La_2O_3$ and 0.01–0.1% by weight of MgO are added to the alpha alumina powders is now explained.

The alumina to which the three additives of 0.3% by weight of $Y_2O_3$, 0.1% by weight of $La_2O_3$ and 0.05% by weight of MgO are added shows improved optical transmission properties and mechanical strength at the sintering temperature of 1,600°–1,800°C which are superior to those of the alumina to which 0.5% by weight of MgO are added according to the prior art as shown in FIG. 1 and also the alumina grains are fine and uniform. On the contrary, the alumina according to the prior art shows an improved optical transmission property only at a sintering temperature higher than 1,800°C, but a reduced mechanical strength and thermal shock resistance owing to an exaggerated grain growth of the alumina grains.

The reason why the polycrystalline translucent alumina according to the invention can be applied to a discharge lamp to protect it against breakage owing to sudden heat change when the lamp is turned on as compared with the prior art is now considered. If use is made of only MgO as an additive, the sintering temperature of more than 1,700°C increases the vapor pressure of MgO and hence accelerates the evaporation of MgO from the surface of the sintered body, with the result that the amount of MgO present at the surface of the sintered body becomes gradually decreased towards the interior part in dependence with the lapse of time and hence the effect of MgO for controlling the grain growth of alumina crystals becomes decreased so that the rate of grain growth of alumina crystals becomes abnormally large whereby the grain size of alumina crystal often becomes several ten microns. This exaggerated grain growth of the alumina crystal affords the disadvantage that the optical transmission property and thermal shock resistance are considerably reduced.

The theoretical investigation for the improved translucency and mechanical strength by addition of the three additives having different effects is not clear until now. However the following reasons are deduced.

$Y_2O_3$ added as the first essential additive of the three additives serves to accelerate the grain growth of the alumina crystals during sintering. Further, $La_2O_3$ added as the second additive serves to prevent the grain growth of the alumina crystals. MgO added as the third additive serves at a temperature lower than 1,700°C to spheroidize the alumina particles. It is necessary to use all of the three additives. An excellently translucent alumina could not be obtained in the absence of any one of the three additives. It is a well-known fact that MgO reacts with $Al_2O_3$ to produce spinel near the grain boundary which prevents the exaggerated grain growth in the sintering step. But MgO is evaporated with increase of the sintering temperature and time to decrease the thickness of the spinel layer and hence to cause grain growth. The presence of the additives such as $La_2O_3$, together with MgO contributes to stabilize the spinel and hence the spinel controls the grain growth up to a high temperature so that the exaggerated grain growth can not occur whereby alumina crystals remain fine and uniform.

$Y_2O_3$ serves to accelerate the grain growth of the alumina crystals at the beginning of the sintering step and to make the molded body of alumina become dense rapidly. But, since the sintering temperature where $Y_2O_3$ acts is low, the exaggerated grain growth of the alumina does not occur. Moreover, during the sintering step effected at a temperature of 1,600°–1,800°C, MgO is gradually evaporated and its effect of spheroidizing the alumina particles becomes decreased. But, up to this time, MgO already has served to spheroidize the alumina particles and further increase the uniformity of the alumina grain.

Furthermore, $La_2O_3$ and $Y_2O_3$ influence the refractive index of the sintered alumina. It is well-known that the translucency of the sintered alumina with only MgO as an additive is decreased by the amount of magnesia-alumina, spinel at the grain boundary. This fact comes from the difference of the refractive index between $Al_2O_3$ and magnesia-alumina spinel and the addition of $Y_2O_3$ and $La_2O_3$ make the refractive index of grain boundary products close to that of $Al_2O_3$. That is why the translucent alumina of the present invention has a high translucency compared to the prior art.

The reason why the amounts of the additives are limited is as follows.

1. The reason why the amount of $Y_2O_3$ is limited to 0.05–0.5% by weight is that addition of less than 0.05% by weight of $Y_2O_3$ makes it difficult to add uniformly in the alumina powders, and that addition of more than 0.5% by weight results in an excessive acceleration of the grain growth at the beginning of the sintering reaction, thereby making the grain size of the alumina crystals in the final article irregular. The reason why the amount of $La_2O_3$ is limited to 0.05–0.5% by weight is that addition of less than 0.05% by weight is ineffective for the same reason as that mentioned above and that addition of more than 0.5% by weight causes an adverse influence upon the thermal shock resistance and anti-corrosion property for alkali metal of the translucent alumina.

2. The reason why the amount of MgO is limited to 0.01–0.1% by weight is that addition of less than 0.01% by weight of magnesia renders it difficult to add MgO uniformly, which causes a risk of local absence of magnesia in the alumina powders and that addition of more than 0.1% by weight of MgO causes the above mentioned evaporation during the sintering steps which only pollutes the furnace and is ineffective for the properties of translucent alumina. The composition ranges of the additives according to the invention makes it possible to manufacture a translucent alumina having desired properties above mentioned. The additives may be added to the alumina powders not only in the form of oxides, but also in the form of salts such as sulphate, nitrates, chloride which can be changed into oxides by the sintering steps.

FIG. 4 indicates the good composition in phase diagram for the optical transmission when the pellets with ⅛ inch thickness were fired at 1,350°C for 2 hours and 1,750°C for 2.5 hours in dry hydrogen. In this diagram, the rate of $Y_2O_3$ to $La_2O_3$ is within 0.5–1.5. Dark area shows above 60% of transmission and cross-hatched area shows above 50%.

The reason why the first sintering step is effected at a temperature of 1,200°–1,450°C and the second sintering step is effected in vacuum or a reducing atmosphere at a temperature of 1,600°–1,800°C is now described.

In general, the sintering reaction is effected as follows. The grain growth of alumina crystals begins at that portion of the alumina particles with large surface energy and then follows another portion of the alumina particles with small surface energy to make the alumina crystals dense with sintering. Subsequently the rate of grain growth of the alumina crystals having a large surface energy is selectively accelerated with increasing the sintering temperature thus preventing the pores from escaping, the so-called exaggerated grain growth of alumina. Thus, it is quite important to make the particle size uniform at the beginning of the sintering reaction and prevent a grain growth at the latter half period.

In accordance with the invention, the first sintering is effected at a temperature of 1,200°–1,450°C for 1–5 hours to make the particle size grown at the beginning uniform by the effect of the additives, particularly of $Y_2O_3$ and further the sintering temperature is maintained at a temperature of 1,600°–1,800°C with preventing the grain growth by the effect of $La_2O_3$ to make it possible to obtain a sintered article consisting of uniform and fine grains.

The sintering time must be varied in dependence upon the kind and form of articles to be obtained and also upon the sintering temperature and hence cannot be determined at a single time. For an article having a thickness of the order of 1 mm, it is most preferable to sinter it at a temperature of 1,350°C for 5 hours and then at a temperature of 1,700°C for 5 hours.

The following examples are given in illustration of this invention and are not intended as limitations thereof.

For a better understanding of the invention, reference is taken to the accompanying drawings, wherein.

EXAMPLE 1

Gamma alumina powders having a high purity of more than 99.0% by weight were calcined in air at a temperature of 1,150°C for 10 hours in an electric furnace to convert them into alpha alumina powders. To one portion of the alpha alumina powders thus calcined 0.5% by weight of magnesia was added in accordance with the prior art, and to another portion 0.05% by weight of magnesia, 0.3% by weight of $Y_2O_3$ and 0.1% by weight of $La_2O_3$ were added in accordance with the present invention.

Each of these two kinds of powders was sufficiently mixed respectively, and then cold pressed by applying 1.4 ton/cm$^2$ to obtain pellets with a dimension of 30 mm dia × 1.5 mm thickness and hexagonal bars with a length of 50 mm. The pellets and hexagonal bars thus obtained were sintered in dry hydrogen gas at a temperature of 1,250°C for 5 hours and then sintered at different temperatures of 1,500°, 1,600°, 1,700°, 1,800°C, respectively, for 5 hours.

Figure 1A:
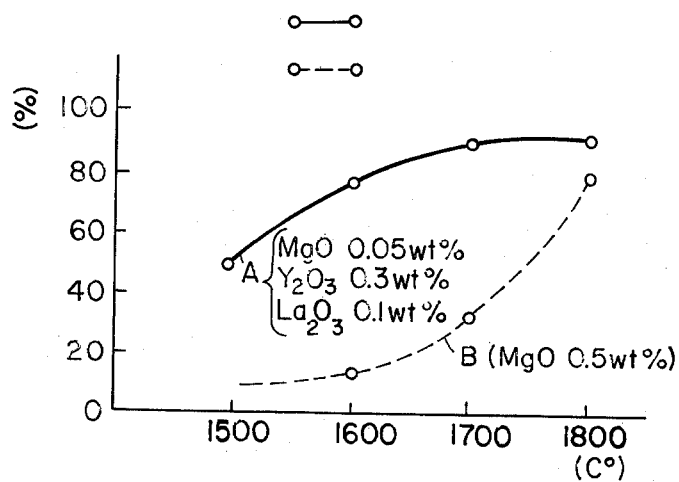
FIG. 1 shows the relations between the sintering temperature on the one hand and the translucency, mechanical strength and average grain size of alumina crystal on the other hand, the curves showing the results obtained by the invention being compared with those obtained by the prior art.
Figure 1B:
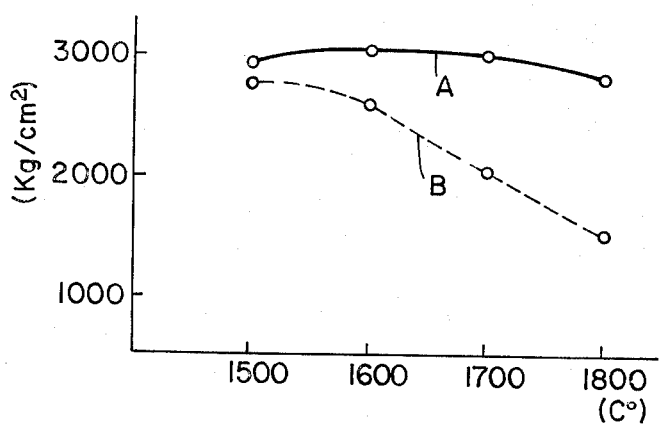
Figure 1C:
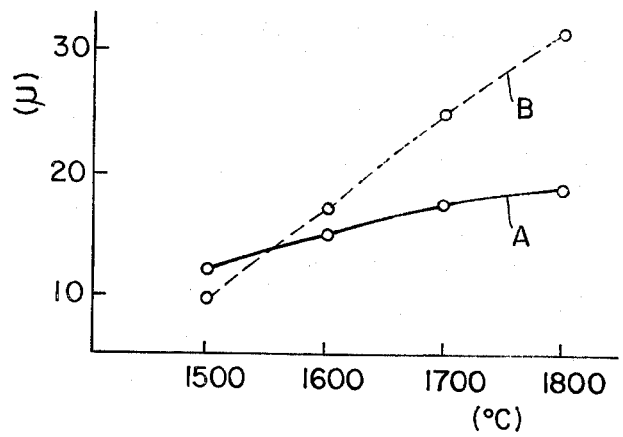

FIG. 1 shows the optical transmission property of the translucent alumina pellets measured by the photometric integrating sphere, as mentioned, for example, in Rosa, E. B. and Taylor, A.H.: "Theory Construction and Use of the Photometric Integrating Sphere", Sci. Paper No. 447, Bull. Bur. Stand., Sept. 26, 1921.

FIG. 1 shows also the flexural strength of the translucent alumina of the hexagonal bars measured by the three points supporting method on the basis of ASTM C 133-37T and the average grain size of alumina crystals measured by a microscopic observation of the cross-section. As seen from the results shown in FIG. 1, translucent alumina to which 0.5% magnesia was added showed an improved optical transmission property at the sintering temperature of 1,800°C, but the flexural strength was greatly reduced at the same temperature. On the contrary, the translucent alumina with the three additives in accordance with the present invention showed an improved optical transmission property at a sintering temperature in the range of 1,600°–1,800°C and its flexural strength in the same sintering temperature range was not so much reduced. The high flexural strength provides good thermal shock resistance.

EXAMPLE 2

Figure 2:
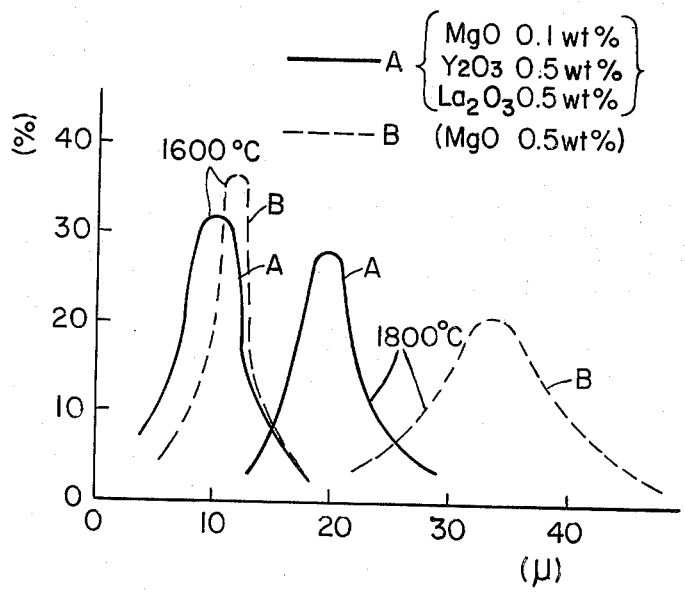
FIG. 2 shows the characteristic curves illustrating the relations between the sintering temperature, the additives and the grain size distribution of the alumina article obtained by the method according to the invention and what obtained by the prior art.
Figure 4:
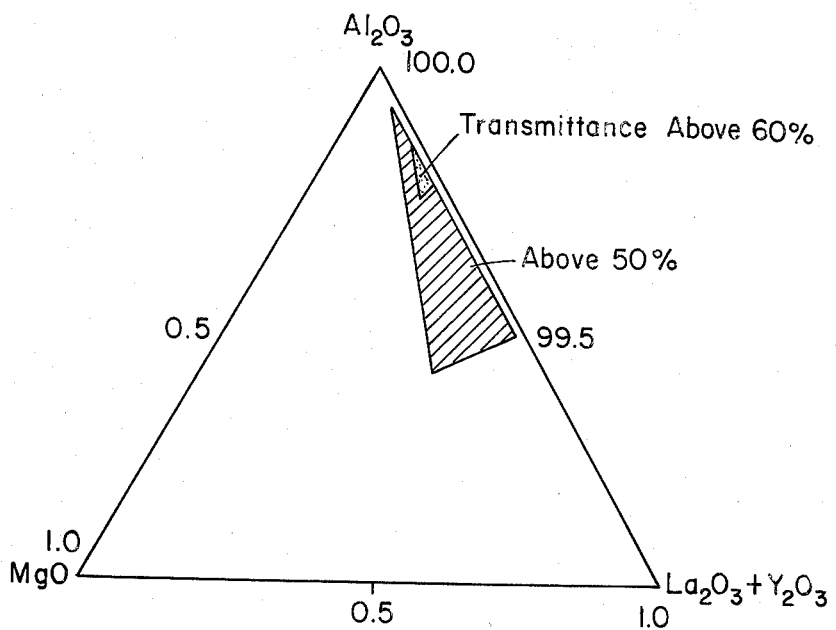
FIG. 4 shows the phase diagram, representing excellent optical transmission properties for light in the visible spectrum.

To alpha alumina powders obtained by calcining gamma alumina having a purity more than 99.0% were added magnesium nitrate, yttrium nitrate and lanthanum nitrate solutions reactable to produce 0.5% by weight of magnesia on the one hand and also reactable to produce 0.1% by weight of magnesia, 0.5% by weight of $Y_2O_3$ and 0.5% by weight of $La_2O_3$ on the other hand to obtain two kinds of powders. Each of these two powders was sufficiently mixed respectively in a trommel and then dried in vacuum. The dried material was then press molded into a pellet by a metal mold with 30 mm diameter. The pellets thus obtained were simultaneously sintered at a temperature of 1,400°C for 3 hours beforehand and then sintered at different temperature of 1,600°, 1,700° and 1,800°C, respectively, for 5 hours with flowing hydrogen gas by activated alumina. The translucent alumina pellets were obtained with a dimension of 30 mm dia ×1.0 mm thickness. The optical transmission property of the translucent alumina pellets by the present invention was more than 80%, while that of translucent alumina pellet by the prior art was 80% when sintered at 1,800°C but was less than 80% when sintered at the other range of temperature. The grain size distribution of the pellets sintered at 1,600°C and 1,800°C was measured by the microscope after sufficiently polished. The results are shown in FIG. 2. In FIG. 2, the characteristic curves for the pellets obtained by the prior art are shown by dotted lines, while those of the present invention are shown by full lines.

As seen from the test results shown in FIG. 2, the translucent alumina with 0.5% magnesia showed an exaggerated grain growth and was irregular in uniformity when sintered at 1,800°C. On the contrary, the translucent alumina by the present invention showed not so exaggerated grain growth of alumina when sintered at 1,800°C and an improved uniformity.

EXAMPLE 3

To alpha alumina powders calcined in the same manner as in Example 1 were added additives as shown in the following Table 1. Each of these powders was thoroughly mixed together and the mixture thus obtained was press molded into a pellet by a metal mold having a diameter of 30 mm. The pellets thus molded were simuntaneously sintered in air at 1,350°C for 5 hours, and then sintered again in vacuum of $3 \times 10^{-4}$ mmHg at 1,700°C for 10 hours to obtain translucent pellets each having a dimension of about 23 mm dia $\times$ 1 mm thickness. The optical transmission property of the translucent pellet is shown in the following Table 1. The samples with or without added 0.5% by weight of magensia are shown in the Table 1 as compared reference.

TABLE 1

| Sample No. | Additive (%) | | | Optical transmission property (%) |
|---|---|---|---|---|
| 1 | none | | | 36 |
| 2 | MgO 0.5 | | | 51 |
| 3 | $Y_2O_3$ 0.3, | $La_2O_3$ 0.3, | MgO 0.01 | 83 |
| 4 | $Y_2O_3$ 0.1, | $La_2O_3$ 0.1, | MgO 0.05 | 81 |
| 5 | $Y_2O_3$ 0.05, | $La_2O_3$ 0.05, | MgO 0.1 | 79 |
| 6 | $Y_2O_3$ 0.1, | $La_2O_3$ 0.2, | MgO 0.1 | 80 |
| 7 | $Y_2O_3$ 0.2, | $La_2O_3$ 0.1, | MgO 0.1 | 82 |

EXAMPLE 4

To calcined alpha alumina powders were added (1) 0.2% by weight of magnesia only and (2) 0.05% by weight of magnesia, 0.25% by weight of $Y_2O_3$ and 0.25% by weight of $La_2O_3$. Each of these two kinds of powders was molded into a pipe-shaped mold. The pipe-shaped materials thus obtained were sintered at 1,300°C for 5 hours and then sintered again in dry hydrogen at 1,800°C to obtain a translucent alumina pipe having a dimension of 10 mm out dia $\times$ 8 mm in dia $\times$ 50 mm length. The optical transmission property of the translucent alumina pipe and the results of thermal shock tests are shown in the following Table 2. The thermal shock test was carried out as follows. The sample was rapidly put into an electric furnace held at 1,200°C and kept therein for 2 minutes. Then, the sample was removed out of the electric furnace and rapidly cooled. Such sequence of steps was repeated.

TABLE 2

| Sample No. | Additive (%) | Times of thermal shock test 1 2 3 4 5 6 7 8 9 10 | Optical transmission property (%) |
|---|---|---|---|
| 1 | MgO 0.2 | o x | 80 |
| 2 | " | o o x | 83 |

TABLE 2-Continued

| Sample No. | Additive (%) | Times of thermal shock test 1 2 3 4 5 6 7 8 9 10 | Optical transmission property (%) |
|---|---|---|---|
| 3 | MgO 0.05 $Y_2O_3$ 0.25 $La_2O_3$ 0.25 | o o o o o o o o o o | 92 |
| 4 | " | o o o o o o o o o o | 96 |

In Table 2 o shows that no crack occurs in the sample and x shows that cracks occur in the sample.

As seen from Table 2, the sample obtained by the present invention is superior in its thermal shock resistance which is a key of a discharge lamp. The grain size distribution of the sample obtained by the prior art was 30–40 microns, while that of the sample obtained by the present invention was 10–15 microns.

EXAMPLE 5

Figure 3:
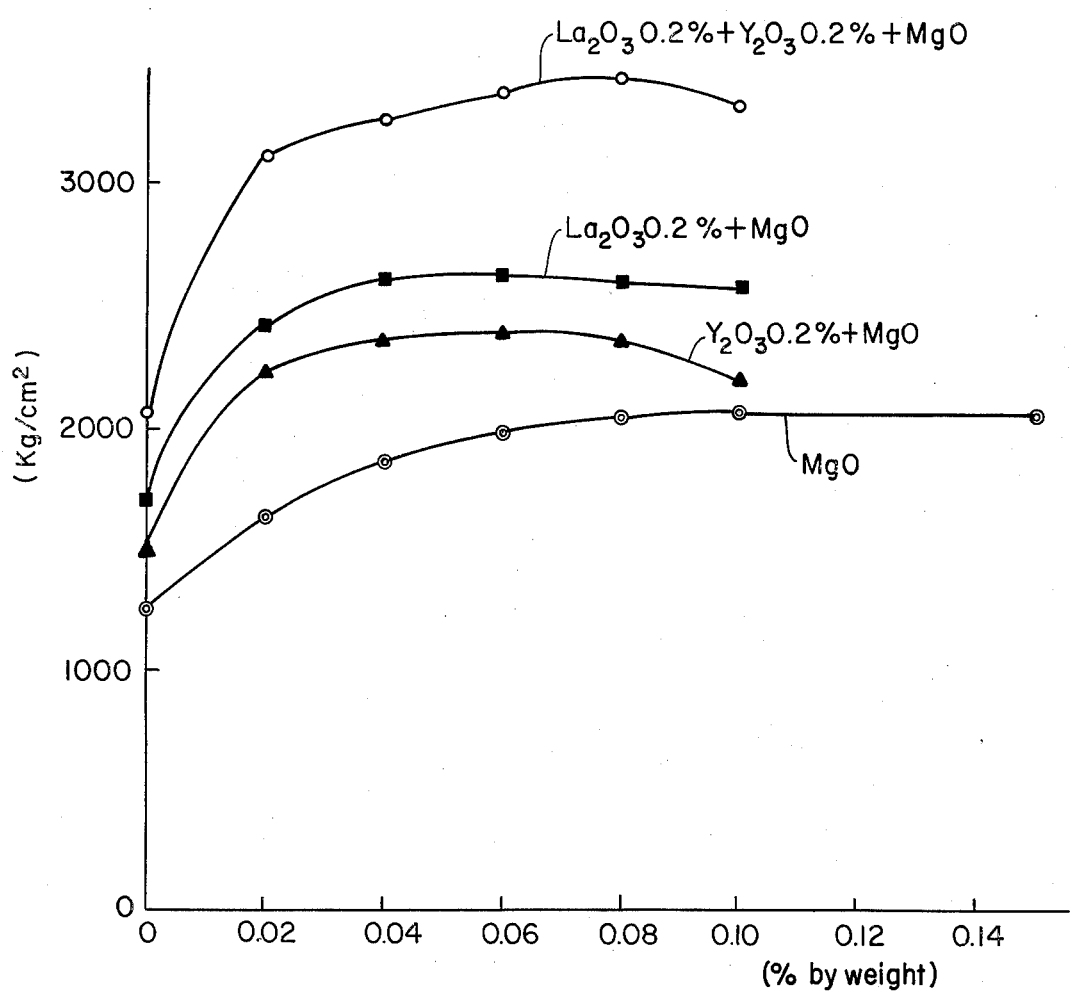
FIG. 3 is a comparison graph of the flexural strength between the translucent alumina obtained by the method according to the invention and that obtained by the prior art.

To calcined alpha alumina powders were added (1) 0–0.15% by weight of magnesia, (2) 0.2% by weight $La_2O_3$, 0–0.1% by weight of magnesia, (3) 0.2% by weight of $Y_2O_3$, 0–0.1% by weight of magnesia, and (4) 0.2% by weight of $La_2O_3$, 0.2% by weight of $Y_2O_3$, 0–0.1% by weight of magnesia. Each of these four kinds of powders was mixed respectively and then cold pressed by applying a pressure of 1.4 ton/cm$^2$ into a hexagonal bar having a length of 50 mm and a pellet having a dimension of 30 mm dia $\times$ 1.5 mm thickness. Each of these hexagonal bars and pellets was sintered in dehydrated hydrogen gas at 1,300°C for 5 hours and then again sintered at 1,700°C for 5 hours. FIG. 3 shows the flexural strength of the translucent alumina hexagonal bar measured by the three point supporting method. As seen from FIG. 3 the samples to which $La_2O_3$ + $Y_2O_3$ + MgO were added showed far superior in flexural strength to the sample to which MgO only was added and to the samples to which $Y_2O_3$ + MgO and $La_2O_3$ + MgO were added. This is explained by the fact that the samples according to the present invention consist of smaller size grains than those of samples according to the prior art. As explained hereinbefore, a sufficient mechanical strength cannot be obtained by addition of MgO only or two of the three additives, but can be obtained by addition of the three additives.

The translucent ceramics such as alumina may be used for an enveloping tube of a high pressure discharge lamp, etc., which requires excellent optical transmission property and thermal and mechanical strength. The sintered bodies by the present invention are superior in these properties to the prior art and can easily be manufactured in a uniform and less expensive manner. Particularly, the present invention provides the important advantage that the sintered body of the present invention can be applied to discharge lamps so as to protect them against breakage owing to sudden heat change to which they are subjected, such breakage being the fatal disadvantage of the prior art.

What is claimed is:

1. A translucent alumina having excellent optical transmission property for the light in the visible spectrum, thermal shock resistance and mechanical strength which consists essentially of 0.05–0.5% by weight of $Y_2O_3$, 0.05–0.5% by weight of $La_2O_3$, 0.01–0.1% by weight of MgO and the remainder of alumina and having an average crystal size of 10–20 microns.

\* \* \* \* \*